No. 778,787. Patented December 27, 1904.

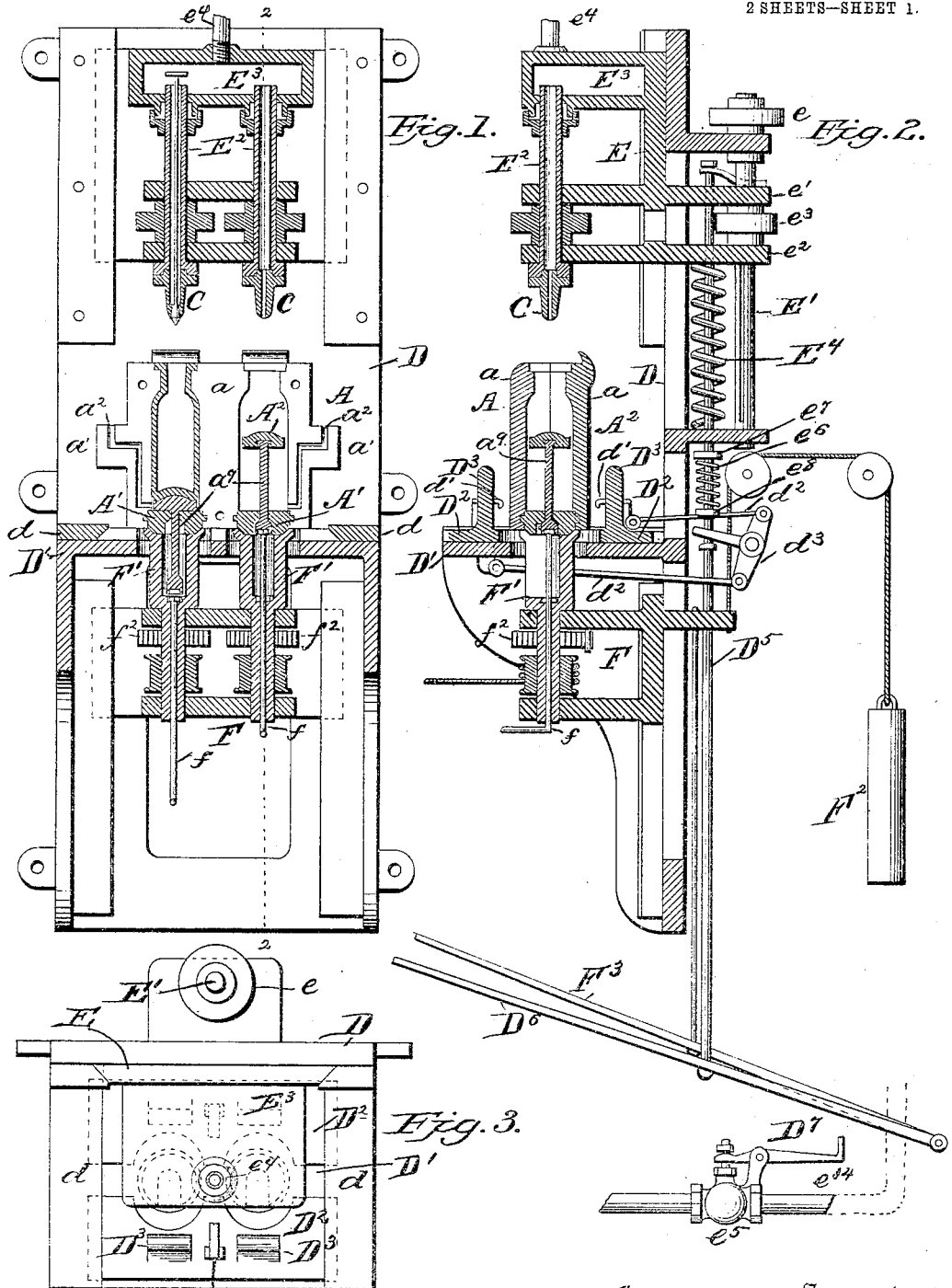

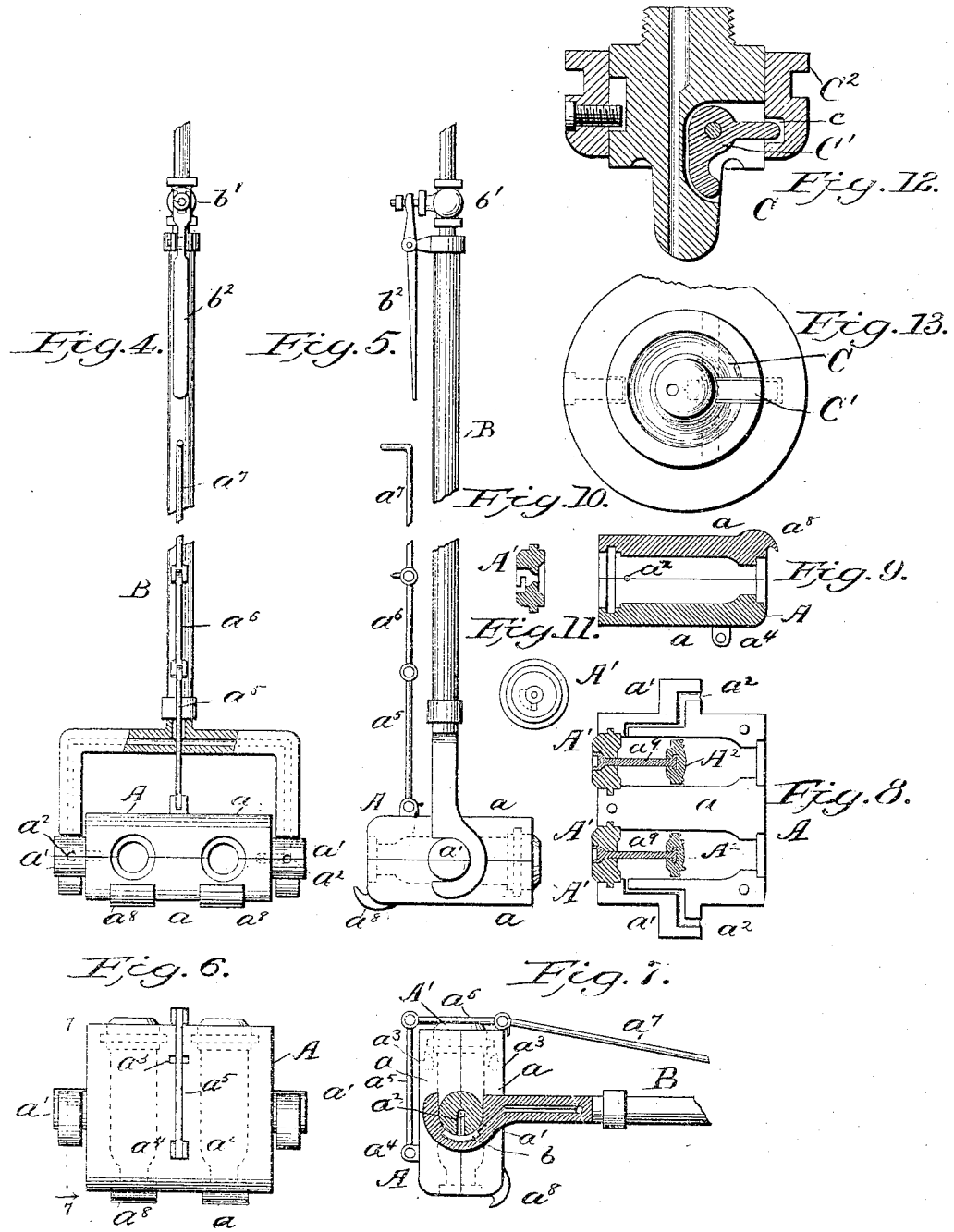

UNITED STATES PATENT OFFICE.

GEORGE A. MARSH, OF SANDUSKY, OHIO.

GLASS-MOLDING APPARATUS.

SPECIFICATION forming part of Letters Patent No. 778,787, dated December 27, 1904.

Application filed October 6, 1903. Serial No. 175,974.

*To all whom it may concern:*

Be it known that I, GEORGE A. MARSH, a citizen of the United States, residing at Sandusky, in the county of Erie and State of Ohio, have invented new and useful Improvements in Glass-Molding Apparatus, of which the following is a specification.

This invention appertains to improvements in apparatus used in the manufacture of hollow glassware, as bottles, which are both pressed and blown to form the completed article, the present invention providing means whereby a bottle or other hollow article of glass may be made in a "separable gathering-mold," by means of which a quantity of molten glass sufficient to form the article is taken from the melting pot or tank by the gathering-mold and while therein is mechanically pressed to form the neck of the bottle or a part of a hollow article, after which the means in the article-forming cavity of the mold for predetermining the quantity of molten glass admitted to the mold is released, and simultaneously air under pressure is admitted to the glass in the mold to form the body portion of the bottle or other article.

The invention also includes a machine which coöperates with the separable gathering-mold to shape the glass taken therein by pressing and by blowing and after the article is formed to separate the mold, lower a part thereof with the shaped article thereon, and when the article is removed to return and position the parts of the mold ready to be removed by the mold-handle to gather when inverted another charge of molten glass from the pot or tank.

In the accompanying drawings, Figure 1 is a front elevation, partly in section, of an apparatus or machine made in accordance with my invention for forming bottles or other articles. In this view a part of a separable mold is on the table, and one of the article-forming cavities contains a shaped bottle. The mold has another article-forming cavity in which the follower is raised. Fig. 2 is a vertical section taken on the line 2 2 of Fig. 1. Fig. 3 is a plan view looking downward upon the top of the apparatus. Fig. 4 is a plan view, partly in section, of a sectional gathering-mold and its handle, the mold being shown in position to be placed on the table of the apparatus. Fig. 5 is a side elevation of the mold and handle in the same position as is shown by Fig. 4. Fig. 6 is a front elevation of the mold in position to draw a charge of molten glass therein from the glass pot or tank. Fig. 7 is a side elevation, partly in section, on the line 7 7 of Fig. 6. Fig. 8 is a side elevation of one of the mold-sections, the mold-bottom and the follower being in section. Fig. 9 is a transverse section of the mold. Fig. 10 is a section of the mold-bottom. Fig. 11 is an inverted plan view of the mold-bottom. Fig. 12 is a transverse section of the neck-forming plunger-nozzle and means attached thereto for internally grooving the neck of a bottle, and Fig. 13 is an inverted plan view of the plunger-nozzle shown in Fig. 12.

Referring to the drawings, A is the mold, made from two separable sections, which when connected have a plurality of bottle or article shaping cavities, so that several bottles or other hollow articles can be made at the same time and by one operation. The sections $a$ $a$ of the mold A have journals $a'$ $a'$ and recesses $a^2$ $a^2$ to form air-passages or ventiducts, which extend from the upper faces of the journals to points slightly above the bottom of the mold. Each section of the mold between the open end of the air-passages and the bottom of the mold and below the article-forming cavities has semicircular recesses which receive the flange of circular mold-bottoms. The sections of the molds have plane abutting faces, guide-pins and registering holes therefor being provided. The article-forming cavities shown are shaped to form bottles or vials and have a groove or recess of a configuration to correspond with the external portion of the neck at the upper portion of the mold-cavities. Exteriorly the mold-sections have undercut recesses $a^3$ $a^3$ for engagement with latches connected to mold-engaging frames, so that when the frames are moved away from each other the sections of the mold will be drawn apart, such separation being effected after an article has been formed in the mold. One of the mold-sections has lugs $a^4$ $a^4$, which project from the side near its upper end, and between these lugs is pivoted one end of a link $a^5$ of sufficient length to extend beyond the bottom of the mold. A second link $A^6$, having a spur to engage the opposite section of the mold when the same is inverted, is attached to the link $a^5$. The spur enables the operator to swing the mold when the rods are pushed upon. A rod $a^7$ engages the link $a^6$, and by moving the rod the inclination of the mold with respect to its support may be changed. The rod $a^7$, when the links attached thereto overlie the side and bottom of the mold, may be drawn upon to turn mold from an inverted position. The rods and links are also used to vary the inclination of the mold, so that the face thereof will be parallel with the surface of the molten glass in the pot or tank. This is a desirable provision, and the gathering of the glass in the mold is not dependent upon the amount in the pot or tank. The mold-section opposite the one having the jointed rod is provided with severing-lips $a^8$, which project beyond the upper face of the mold to one side of the entrances to the article-forming cavities. The lips when the mold is turned separate the glass gathered in the mold from that in the pot or tank and are effective at about the instant that the air-passages through the journals have passed the air-passages in the bearings of the yoke attached to the handle. The severing-lips effectively prevent the molten glass in the pot or tank pulling the charge from the mold-cavities.

Each of the cavities of the mold have annular bottoms $A'$, the same being provided with flanges for engagement with recesses in the mold-sections. The bottoms $A'$ are of such thickness that when in place they extend beyond the bottom walls of the mold, and the edges of the projecting lower portions are beveled, as shown. The opening through each mold-bottom is constructed to provide an angular slot and above said slot a seat for the conical portion of the rod $a^9$, the lower end of the rod having a socket for the reception of a releasing-bar. The upper ends of the rods $a^9$ carry followers $A^2$, which form the bottom of the matrices, the lower portions of the followers being shaped to fit snugly upon the mold-bottoms. The opposite side, which forms the bottom of the matrix, may have spurs to enter the bottom of the article to effect a turning of the same when the bottom of the matrix is turned for the purpose of removing mold-marks from the bottle or other article. The followers or bottoms of the matrices are of less diameter than the cavities in the mold-sections, and in drawing molten glass in the matrices air is exhausted therefrom through the openings between the bottoms of the mold and the disks which form the bottoms of the matrices.

The handle or support B for the mold has a yoke or forked end, the side members having bearings for engagement with the journals which project from the mold. The lower parts of the bearings have channels or recesses $b$ to register with the air-passages of the journals and communicate with the passages in the arms of the yoke and hollow handle. The handle has a valve $b'$, the stem thereof being engaged by a lever $b^2$, and beyond the valve there is a flexible connection through which air is exhausted through the ventiducts from the cavities of the mold when the valve is lifted from its seat. When the mold is inverted, the air-passages of the mold and handle communicate, and to fill the mold-cavities with molten glass taken from the glass pot or tank the mold is placed therein to submerge the inlet-openings of the article-forming cavities. Air is then exhausted from the matrices and sufficient molten glass is drawn into the matrices, an excess being prevented by the disks or followers $A^2$, beyond which the glass will not be drawn by the pressure or exhaust used. The followers being of less diameter than the matrix or interior of the molds and being locked in position by reason of the lugs on the rods $a^9$ engaging the angular portion of the mold-bottoms are not moved by suction.

In the manufacture of certain types of bottles it is desired to form inside of the mouth a recess to receive an internal stopper, and to accomplish this the neck-forming plunger C has to one side of the air-passage therethrough a recess in which is pivoted a bell-crank arm or grooving member $C'$, one end being shaped to form the recess and the other end to engage with a recess $c$ in a sliding ring $C^2$. The ring when raised projects the recessing end of the part $C'$ beyond the plunger-nozzle C. The plunger-nozzle C may enter the recess in the upper portion of the mold and the ring may then bear upon the surface of the mold adjacent thereto. The ring $C^2$ is held in engagement with the plunger-nozzle by a pin or set-screw, as shown, and the ring has a circumferential groove for engagement therewith of a forked tool for lowering or otherwise moving the ring.

The apparatus or machine which is used in connection with the mold includes in its construction a frame D, having a fixed table $D'$, with openings large enough to admit of lowering therethrough the mold-bottoms $A'$. The table has guide-strips $d\ d$ for horizontally-movable slides $D^2$, each slide having upward-projecting arms $D^3$ to engage the sides of the molds when on the table, and between the arms are latches $d'\ d'$, the depending ends thereof entering the recesses $a^3$ to engage the mold-sections and separate them when the slides are moved away from each other. The slides are connected by rods $d^2$ to a rock-lever $d^3$, provided with an arm which is engaged by collars on a vertically-movable rod $D^5$, the upper end of the rod being connected to the frame E, carrying the plunger-nozzles. The upper portion of the main frame carries a vertically-movable frame E, which is lowered when the treadle attached to the rod $D^5$ is depressed. The frame E slides vertically between guide-plates on the front of the main frame D and upon a driven shaft $E'$, journaled in brackets which project rearward from the frame D. The upper end of the shaft carries a drive-pulley $e$, and on the shaft between the rearward-projecting members $e'$ $e^2$ of the sliding frame is a pulley $e^3$, which slides on the shaft $E'$ and engages a keyway therein. The pulley $e^3$ drives a pulley on the rotary and tubular shafts $E^2$, to the lower ends of which are attached the plunger-nozzles C. In the upper portion of the vertically-sliding frame E there is provided an air-chamber $E^3$, into which pass the upper ends of the hollow shafts $E^2$. The chamber communicates with an air-supply under pressure through a flexible pipe attached to the pipes $e^4$ $e^{14}$, and when the valve $e^5$ is opened air under pressure will pass through the plunger-nozzles to shape by blowing the glass in the matrices of the mold. The rod $D^5$ is encircled between the part $e^2$ of the sliding frame and a fixed bracket with a spring $E^4$, which raises the frame when the treadle $D^6$ is released. A weaker spring $e^6$ is placed on the rod $D^5$ between a fixed collar $e^7$ and a movable collar $e^8$. The latter collar engages with the arm of the rock-lever as the rod is depressed by the treadle $D^6$, such construction permitting the rod to be lowered after the arms $D^3$ have engaged the mold, and the upper end of the rod is connected to the frame by a spring to permit a downward movement of the rod after the plunger-nozzles have entered the open ends of the mold. After the slides have been moved toward each other so the clamping-arms will engage the sides of the mold and the plunger-nozzles have pressed the neck of the bottle the treadle is further depressed to engage a lever $D^7$ and open the valve $e^5$ and admit air under compression to the plunger-nozzles C, such movement taking place after the rods carrying the matrix-bottoms have been released from the mold-bottoms, as below described.

To the lower portion of the frame D there is secured a vertically-movable frame F, which carries hollow rotary supports $F'$, the upper ends thereof being shaped to snugly engage the beveled portions of the mold-bottoms. The lower portion of the supports have in sliding engagement therewith rods $f$, the lower ends being bent, as shown. The upper ends of the rods $f$ are adapted to engage and turn the bars $a^9$ to disengage the catches thereon from the angular recesses in the mold-bottoms and allow the matrix-bottoms to rest upon the mold-bottoms. The frame F is held raised by a counterweight $F^2$ and is lowered by depressing a foot-lever $F^3$. The support $F'$ is turned in one direction by a drum attached thereto and provided with a flexible connection and in an opposite direction by a coiled spring $f^2$, attached to the support and to a fixed part of the sliding frame.

In operation the mold is charged by sucking into the same directly from the glass pot or furnace a quantity of molten glass sufficient to form therefrom an article, as hereinbefore set forth, and the mold, with charges of molten glass in the matrices, is placed, by means of the handle, upon the table $D'$, the mold-bottoms engaging the flared upper ends of the rotary supports $F'$, which centers the mold on the table. The lever $D^6$ is depressed, which movement lowers the frame E, brings the nozzles into the upper portion of the molds and into the charges of molten glass, which are sustained by the bottom of the matrices, each nozzle compressing the glass to form the neck of the bottle. The plunger-nozzles C are rotated and may be provided with means for internally grooving the neck, as above described. There may also be present stoppers or valves for the ends of the plunger-nozzles. When the necks of the bottles have been pressed in the matrices, the rods $f$ $f$ are turned to release the matrix-bottoms, which descend and bear upon the mold-bottoms. The lever $D^6$ being further depressed opens the valve $e^5$, and air under compression passes through the hose and pipes, through the plunger-nozzles, completing the bottle by blowing. Should it be desired to remove the mold-marks from a cylindrical bottle, the supports $F'$ may be turned by drawing upon the flexible connection, which is passed about the drum attached to the lower portion of the support. When the bottles have been formed, the lever $D^6$ is released. The frame E being lifted by the spring, the rock-lever is tilted by the fixed collar on the rod $D^5$ to separate the slides $D^2$, which are provided with upward-projecting parts or arms $D^3$, having catches $d'$, which engage the sections of the mold and separate the same, leaving the bottles standing upon the bottoms of the matrices, which rest on the mold-bottoms. The frame F is lowered by depressing the foot-lever $F^3$, and the attendant removes the bottle from beneath the table, leaving the bottoms of the mold and matrices in place. The catches $d'$, which enter the recesses $a^3$ in the mold, are preferably made of spring metal, or they may be pivoted, the catch-faces thereof being slightly inclined, and when the mold is raised the catches will be moved upward and disengaged from the recesses in the mold. When the completed bottles have been removed, the treadle $F^3$ is released, which allows the frame F to return to its normal position. The lever $D^6$ is depressed, which brings the mold-sections together, and the rods $f$ are raised to engage and lock the rods $a^9$ in an elevated position. The handle B is now placed so that its hooked ends will engage the bearings of the mold, and the treadle being released permits the mold to be removed by the handle and when inverted is ready to take a charge of molten glass from the pot or tank. If desired, when the frame E is lowered air may be admitted through the plunger-nozzles into the mold-cavities to assist in cooling the mold.

If found desirable in practice, the matrices of the molds may be charged with molten glass otherwise than by sucking the charge therein, and the ducts through which air is exhausted from the matrices may be utilized to permit air to escape as the mold is being charged. It will be particularly noted that the construction shown dispenses with neck molds or rings to sustain the parison or charge prior to blowing and that in practice the mold is charged through its contracted or neck portion and is not removed from the matrix until the bottle or other hollow object is blown to final shape.

I do not wish to limit my invention simply to forming bottles, as it may be used in the manufacture of many kinds of hollow glassware. The plunger-nozzles may be varied in shape and size to accord with the shape and size of the bottle, and they are removably attached to the lower ends of the rotary tubes. Many of the parts are susceptible of modification as to the details of construction.

Having thus set forth my invention, what I claim as new, and desire to secure by Letters Patent, is—

1. In a glass-working apparatus, the combination of a combined gathering and article-forming mold, means for drawing a charge of molten glass therein, a charge-support fixedly maintained in the mold, a mold-support, means for pressing the charge in the mold to form a part of the article, means for releasing the charge-support and means for completing the article in the mold by blowing through the pressing means, substantially as set forth.

2. In an apparatus for forming hollow glass articles, a separable gathering-mold with a plurality of matrices having air-passages from the matrices therein to the outer portion of the mold, and a handle for engagement with the mold which has openings communicating with the air-passages from the matrices.

3. In an apparatus forming hollow glass articles a separable gathering-mold, comprising mold-sections having article-forming cavities therein, a mold-bottom separable from the mold, means for exhausting air from the cavities in the mold to draw a charge of molten glass therein, a charge-support or follower within the article-forming cavities of the mold and means attached to the follower or charge-support to engage the mold-bottom, for the purpose set forth.

4. In a glass-working apparatus for forming hollow articles, a separable mold adapted to be manipulated upon a support to gather a charge of molten glass in said mold from a glass pot or tank, a follower or charge-support maintained in the mold, means for shaping by pressing the charge to form a part of the article in the gathering-mold, means for releasing the charge-support and means for completing the article by blowing.

5. In a glass-working apparatus for forming hollow articles from molten glass, a unitary gathering tool and mold having journals, a handle having arms with bearings for the journals and means for turning the gathering-mold in the bearings of the handle.

6. In a glass-working apparatus, a gathering and molding tool comprising separable mold-sections having divided journals, a handle having bearings for the journals and means for turning the mold-sections in the journals.

7. In a glass-working apparatus, a hollow mold-carrier having mold-engaging arms with bearings and air-passages which extend from the handle of the carrier to its bearings, mold-sections having journals and air-passages which extend from the journals to near one end of each matrix of the mold and means for turning the mold-sections on their journals to place the air-passages in and out of communication, substantially as shown.

8. In a glass-working apparatus, a separable mold having journals and ventiducts between the matrices of the mold and its journals, a mold-carrier having mold-engaging arms with bearings for the journals of the mold, ventiducts in the carrier and its arms which extend to the bearings and a rod connected with the mold for the purpose of swinging the same on its journals when in engagement with the bearings of the mold-carrier.

9. In a glass-molding apparatus, a mold having journals, a handle with bearings for said journals, a jointed rod attached to one of the mold-sections to turn the mold in the bearings of the handle.

10. In combination with a mold having journals, lugs on one of the mold-sections, a link of a length sufficient to extend from the lugs to the bottom of the mold, a second link connected to the first link which is adapted to extend across one end of the mold, a spur carried by the link to engage the side of the mold and a rod connected to the shorter link.

11. In a glass gathering and molding apparatus, a mold having article-forming chambers therein, mold-bottoms separable from the mold, a follower in each of the article-forming chambers, means for connecting the followers to the mold-bottoms and air-passages extending from a point near each mold-bottom to the exterior of the mold, for the purpose set forth.

12. In a glass-working apparatus, a gathering and shaping mold comprising mold-sections with article-forming cavities therein, bottoms for each of the cavities which are separable from the mold-sections, followers maintained in each of the cavities by engagement with the mold-bottoms and means for exhausting air from the cavities of the mold to said cavities with a charge of molten glass which is sucked into the cavities from a glass pot or furnace, substantially as set forth.

13. In combination with a mold made up of separable sections, an annular and separable bottom for the mold, a follower in the article-forming chamber of the mold and air-passages from the exterior of the mold which communicate with the article-forming chamber between the mold-bottom and the follower.

14. In a glass-molding apparatus, a mold which is placed in molten glass to gather a charge therein by exhausting air from the article-forming cavities of the mold, a follower in the article-forming cavity of the mold having means attached thereto to limit the movement of the follower toward the open end of the mold, a bottom for the mold through which the means for limiting the movement of the follower passes, and an air-passage entering the mold between its bottom and the follower.

15. In a glass-molding apparatus, a mold, means for exhausting the air in the mold to draw molten glass therein when the open end of the mold is submerged in molten glass, a follower or bottom-shaping member locked in position within the mold while being charged, and means for releasing the follower after the mold has received its charge.

16. In a glass-molding apparatus, a separable mold, a support upon which the mold may swing, means for exhausting air from the mold through its support, an annular bottom for the mold which is separable therefrom, a follower within the mold, a rod attached to the follower which rod passes through the bottom of the mold and means on the rod and the bottom for holding such parts in engagement.

17. In a bottle-molding machine, an apertured mold-bottom which is separable from the mold, a follower in the article-forming cavity of the mold, a rod attached to the follower and passed through the aperture in the mold-bottom, conical engaging faces on the rod and mold-bottom and means for effecting by a partial rotation of one of the parts a positive engagement of the rod with the mold-bottom.

18. In a bottle-making machine, a mold, a nozzle for pressing a plastic charge of glass in the mold to form the upper end and the neck of the bottle, means carried by the nozzle to form when projected an internal recess in the neck of the bottle, and an air-passage through the nozzle for shaping by air under pressure the body portion of the bottle.

19. In a glass-blowing apparatus, the combination of the following instrumentalities, a separable mold having article-forming cavities, bottoms therefor which are separable from the mold, a fixed table having openings therethrough, mold-engaging clamps in reciprocatory engagement with the table, supports for each of the mold-bottoms and means for raising and lowering said supports.

20. In glass-blowing mechanism, a mold and a mold-bottom separable therefrom, a fixed table, mold-clamps movable to and from each other, a vertically-movable support for the mold-bottom which passes through the fixed table and means for raising and lowering such support and the mold-bottom.

21. In a glass-molding apparatus, a supporting-frame, a table or bracket having an opening therethrough, a vertically-movable and rotatable mold-bottom and article-support, and a vertically-movable and rotatable plunger-nozzle having an air-passage therethrough, substantially as shown.

22. In a glass-molding apparatus, a separable mold having article-forming cavities and below such cavities annular recesses, a mold-bottom with circumferential flanges for engagement with the recesses, a support for the mold, a vertically-movable support for the mold-bottoms and laterally-movable clamps to engage the mold, for the purpose set forth.

23. In a glass-molding apparatus, a mold having an article-forming cavity, a revoluble pressing, grooving and blowing plunger-nozzle, grooving means pivoted to the plunger and provided with an engaging ring which contacts with the mold when the plunger is inserted therein, and a follower in the mold-cavity which forms a support for the glass when the plunger is inserted in the neck of the mold to press the blank.

24. In a glass-molding apparatus, a mold, a mold-bottom separable from the mold, a table having an opening therethrough, mold-clamps in sliding engagement with the table, a vertically-movable support for engagement with the bottom of the mold, and a neck-forming plunger-nozzle with an aperture therethrough for insertion into the upper end of the mold.

25. In a glass-working apparatus, the combination of the following instrumentalities, a mold, a mold-bottom which is separable from the mold, a fixed table, mold engaging and separating clamps, a vertically-movable plunger-carrying frame, a hollow plunger-nozzle rotatably connected to the frame and in communication with an air-chamber, actuating means for moving the clamps toward each other and by a continuation of its movement placing the plunger-nozzle in the mold and admitting compressed air through the nozzle.

26. In a glass-molding apparatus, the combination of a separable mold, a mold-bottom which is detachable therefrom, a table having an opening therethrough, reciprocating mold-clamps, a vertically-movable plunger-nozzle, a support for the plunger-nozzle, unitary means for moving the mold-clamps toward each other, lowering the plunger-nozzle into the mold and admitting air under compression to the mold, a support for the bottom section of the mold and means for lowering the support, substantially as shown.

27. In a glass-molding apparatus, a mold, a mold-bottom separable therefrom, a supporting-frame, a bracket fixedly attached thereto, mold-clamps in sliding engagement with the bracket, a vertically-movable and rotatable mold-bottom support below the bracket, a movable frame having a hollow and rotatable plunger-nozzle, an air-supply in communication with the hollow plunger-nozzle and means for establishing communication between the air-supply pipe and the plunger-nozzle when the nozzle enters the mold, for the purpose set forth.

28. A glass-forming apparatus comprising a mold or matrix, means for charging the matrix directly from a glass-pot by exhausting air from the matrix, means for forming a part of the article by compressing the charge in the matrix, means for enlarging the capacity of the matrix and means for completing the article in the matrix by blowing.

29. A glass-forming apparatus comprising a separable matrix in which the glass is taken from the glass pot or furnace and is shaped therein, means carried by the matrix for holding the charge in the end of the matrix where it is gathered, a nozzle for shaping a part of the article by being forced into the charge in the matrix, means for releasing the charge-holding means and means for expanding the molten glass against the walls of the matrix by air under pressure admitted through the nozzle to complete the shaping of the article.

30. An apparatus for forming hollow glass articles comprising a matrix, means for charging the matrix by sucking a charge therein from a glass pot or furnace by exhausting air from the matrix, means for shaping a part of the article by forcing a nozzle into and against the matrix and into the charge of molten glass and means for finishing the article by forcing air through the nozzle, substantially as set forth.

31. In a glass-working apparatus, the combination with a partible mold, of means for charging the matrix of the mold through its contracted end with molten glass taken directly from a glass pot or tank, means within the matrix of the mold which when raised holds the charge in that part of the matrix adjacent to its contracted portion, and a combined pressing and blowing nozzle for shaping the charge in the mold.

32. In a glass-working apparatus, a gathering and shaping mold, means for holding the charge gathered in the mold against expansion, a plunger-nozzle for shaping a part of the article by compressing the charge in the mold, means carried by the nozzle for forming an internal groove in the pressed part of the article and an air-passage through the nozzle connected with a supply of air under compression, for the purpose set forth.

33. In a glass-molding apparatus, a mold having an article-forming cavity therein, a plunger-nozzle, grooving means movable beyond a part of the plunger when inserted in the mold and means for rotating the plunger-nozzle.

34. In a glass-molding apparatus, a mold having an article-forming cavity therein, a revoluble plunger-nozzle having a sliding member for engagement with the mold and neck-grooving means carried by the nozzle and projected therefrom when the sliding member is raised by engagement with the mold, substantially as set forth.

35. In a glass-forming apparatus, a partible mold having a matrix in which a complete hollow article is formed, means for charging the matrix through its contracted portion or neck with molten glass taken directly from a glass pot or tank, means for forming a part of the article by pressing the charge in the matrix and means for expanding a portion of the charge in the matrix by blowing.

36. In a glass-molding apparatus, a partible mold in which the charge is gathered and wherein the article is shaped, means for charging the mold with molten glass through its contracted portion, and means within the mold for determining the quantity of the charge said means also serving as a support for the charge.

In testimony whereof I have affixed my signature in the presence of two witnesses.

GEORGE A. MARSH.

Witnesses:
EUGENE W. JOHNSON,
C. H. WALKER.